United States Patent
Mizuno et al.

(10) Patent No.: US 9,937,821 B2
(45) Date of Patent: Apr. 10, 2018

(54) CENTER SEAT STOPPER CONTROL

(71) Applicant: AISIN TECHNICAL CENTER OF AMERICA, INC., Northville, MI (US)

(72) Inventors: Ryosuke Mizuno, Novi, MI (US); Michael Mixon, Plymouth, MI (US)

(73) Assignee: AISIN TECHNICAL CENTER OF AMERICA, INC., Northville, MI (US)

( * ) Notice: Subject to any disclaimer, the term of this patent is extended or adjusted under 35 U.S.C. 154(b) by 144 days.

(21) Appl. No.: 14/720,439

(22) Filed: May 22, 2015

(65) Prior Publication Data

US 2016/0339808 A1 Nov. 24, 2016

(51) Int. Cl.
| | |
|---|---|
| B60N 2/00 | (2006.01) |
| B60N 2/07 | (2006.01) |
| B60N 2/01 | (2006.01) |
| B60N 2/06 | (2006.01) |
| B60N 2/08 | (2006.01) |
| B60N 2/30 | (2006.01) |

(52) U.S. Cl.
CPC ............. *B60N 2/0727* (2013.01); *B60N 2/01* (2013.01); *B60N 2/062* (2013.01); *B60N 2/0715* (2013.01); *B60N 2/0825* (2013.01); *B60N 2/0843* (2013.01); *B60N 2/3045* (2013.01)

(58) Field of Classification Search
CPC ...... B60N 2/0705; B60N 2/01; B60N 2/0722; B60N 2/0715; B60N 2/07; B60N 2/0825; B60N 2/0843; B60N 2/0887; B60N 2/06; B60N 2/0735; B60N 2/0208; B60N 2205/20
USPC ................................ 248/424, 425, 429, 430
See application file for complete search history.

(56) References Cited

U.S. PATENT DOCUMENTS

| | | | |
|---|---|---|---|
| 5,800,015 A * | 9/1998 | Tsuchiya .............. | B60N 2/0715 248/430 |
| 6,609,745 B2 | 8/2003 | Miyahara et al. | |
| 6,869,057 B2 * | 3/2005 | Matsumoto .......... | B60N 2/0705 248/429 |
| 7,665,703 B2 * | 2/2010 | Tanaka .................. | B60N 2/062 248/424 |
| 7,901,004 B2 * | 3/2011 | Figueras Mitjans .... | E04H 3/123 297/232 |
| 8,393,591 B2 * | 3/2013 | Mizuno ................ | B60N 2/0705 248/424 |

(Continued)

FOREIGN PATENT DOCUMENTS

| | | |
|---|---|---|
| JP | 9-39615 A | 2/1997 |
| JP | 4631327 B2 | 2/2011 |
| JP | 2013-169950 A | 9/2013 |

OTHER PUBLICATIONS

Office Action dated Mar. 28, 2017 in Japanese Patent Application No. 2016-071452 (with English language translation).

*Primary Examiner* — Nkeisha Smith
(74) *Attorney, Agent, or Firm* — Oblon, McClelland, Maier & Neustadt, L.L.P.

(57) ABSTRACT

A seat arrangement apparatus for a vehicle seat that includes at least two tracks fixed to a floor of a vehicle each track including a base separating a first hollow portion and a second hollow portion, at least two seat mounting assemblies movable along the at least two tracks, and a stopper movably installed inside each of the at least two tracks between the at least two seat mounting assemblies to prevent the at least two seat mounting assemblies from touching each other when positioned together.

3 Claims, 11 Drawing Sheets (56) References Cited

U.S. PATENT DOCUMENTS

| | | | |
|---|---|---|---|
| 8,573,674 B2* | 11/2013 | Otsuka | B60N 2/0715 |
| | | | 296/65.09 |
| 9,061,604 B2* | 6/2015 | Kume | B60N 2/065 |
| 2005/0285007 A1 | 12/2005 | Tanaka | |
| 2013/0214113 A1 | 8/2013 | Kume et al. | |
| 2015/0239368 A1* | 8/2015 | Mischer | B60N 2/0705 |
| | | | 248/429 |

* cited by examiner

CENTER SEAT STOPPER CONTROL

BACKGROUND

Field of the Disclosure

This application relates generally to improvements to a seat arrangement structure. More particularly the present disclosure relates to improvements relating to a seat arrangement tracks that include a seat separator device to avoid contact between two seats.

Description of the Related Art

Vehicle seats are designed to offer comfort, and space to an occupant by allowing seat adjustments to a desired position. The adjustable vehicle seat allows an occupant to obtain a more comfortable seating position and to provide space behind, in front or on side of the vehicle seat to assist in entering and exiting the vehicle or storing objects.

Vehicle seats are typically mounted on a seat arrangement device. The seat arrangement device allows for relative movement of the seat with respect to the vehicle and other seats respectively. For instance the seat arrangement device provides for a seat to be moved away or moved toward other seats, moved in lateral (sideways) or longitudinal (forward and backward) direction of the vehicle.

One such example of a seat device is disclosed in U.S. Pat. No. 6,609,745B2. This seat device includes a substantially flat floor surface substantially extending across a full cabin space of the vehicle, front row seats, center row seats and a rear row seat disposed in a longitudinal direction of the vehicle on the floor surface.

The seat arrangement device assembly and seat mounting is often a complex process, as it involves various components assembled in a particular order to enable seat movement in a desired direction. One of the components of seat arrangement device is a track arrangement fitted with a seat sliding device to achieve the desired lateral and longitudinal movement of the seats. The lateral movement involves moving a seat towards a side of a vehicle or moving the seat towards the other seat followed by locking the seat in a desired position. Further, to lock the seat in a desired position a locking or latch mechanism may be provided.

A linear adjustable vehicle seat allows an occupant to obtain a more comfortable seating position and to provide additional space around the vehicle seat for ease of entering and exiting or storing objects. Further, latch mechanisms are generally known for locking the vehicle seat position at a plurality of locations. Seat latch mechanisms are generally known as pawl and positive engagement latch-type devices and mechanisms.

A part of the seat sliding device that assists in locking and unlocking the seat in a desired position is called a towel bar or operating handle assembly. Typically the towel bars employ a lever and rotation mechanism whose function is to place the locking mechanism in a locked or unlocked position. The towel bar operates when a vertical force is applied to the lever that leads to the rotation of a bar connected to the locking mechanism, thus placing the locking mechanism in the locked or unlocked position. The force may be applied by an operator.

Tracks of the seat arrangement device are typically fixed to the vehicle floor before mounting the seat on the seat arrangement device. During the seat mounting process as well as during the seat adjustment process it is desired to keep the seats apart for ease of mounting and comfort of the passengers. However during the seat adjustment process the sliding rails of the track may move towards each other without stopping and touch each other. To avoid an undesirable situation and to keep seats apart additional seat sliding control elements must be installed.

There remains a continuing need to provide improved seats having higher level of comfort and more degrees of freedom, provide greater performance to above than compared to the known seats.

SUMMARY

According to an embodiment of the present disclosure, there is provided a seat arrangement apparatus for a vehicle seat apparatus. The seat arrangement apparatus includes at least two tracks fixed to a floor of a vehicle each track including a base separating a first hollow portion and a second hollow portion, at least two seat mounting assemblies movable along the at least two tracks, a stopper movably installed inside either of the at least two tracks between the at least two seat mounting assemblies to prevent the at least two seat mounting assemblies from touching each other when positioned together.

Further, the stopper includes a first shoe configured to be moveable in the first hollow portion, a second shoe configured to be moveable in the second hollow portion, and a bracket. The bracket includes a first flange that connects to a first slot of the first shoe and a second flange that connects to a second slot of the second shoe. The first shoe includes first rib on a side opposite of the first slot, the first rib configured to slide on an inner peripheral face of the first hollow portion, and the second shoe includes second rib on a side opposite of the second slot, the second rib configured to slide on an inner peripheral face of the second hollow portion.

Further, each track includes a plurality of holes that are used to engage and disengage a locking mechanism when a force is applied at an operating handle.

The forgoing general description of the illustrative implementations and the following detailed description thereof are merely exemplary aspects of the teachings of this disclosure, and are not restrictive.

DETAILED DESCRIPTION

In the drawings, like reference numerals designate identical or corresponding parts throughout the several views. Further, as used herein, the words "a", "an" and the like generally carry a meaning of "one or more", unless stated otherwise. The drawings are generally drawn to scale unless specified otherwise or illustrating schematic structures or flowcharts.

Furthermore, the terms "approximately," "proximate," "minor," and similar terms generally refer to ranges that include the identified value within a margin of 20%, 10% or preferably 5% in certain embodiments, and any values therebetween.

The terms "longitudinal", "lateral" and similar terms generally refer to the direction of movement with respect to the vehicle's front and side portion. The direction of movement along the front and rear is the longitudinal direction, while direction of movement towards and away from the side of the vehicle is the lateral direction.

The terms "towel bar", "operating handle" or "U-handle" are used interchangeably and refer to the same component.

Figure 1:
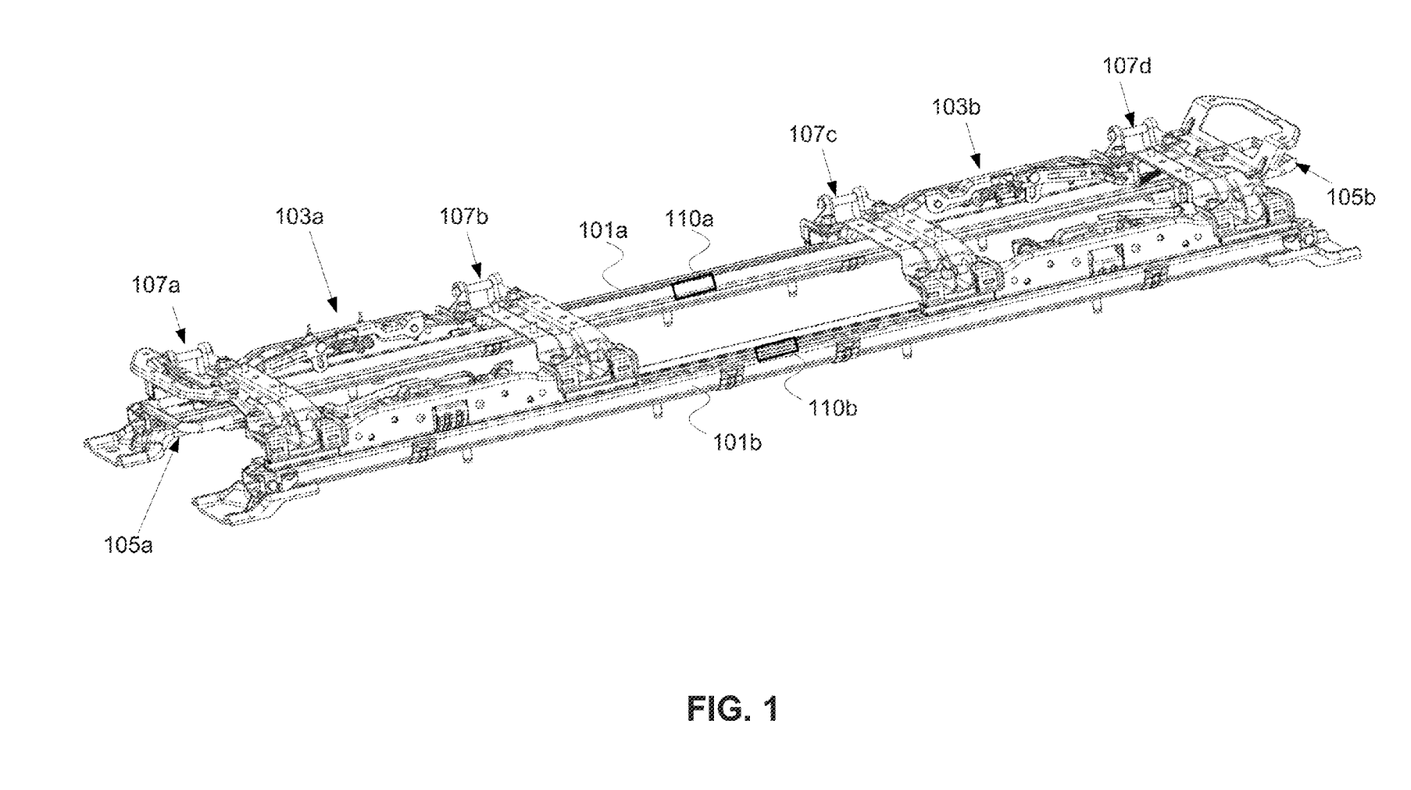
FIG. 1 is a perspective view of a vehicle seat slide apparatus according to an exemplary aspect of present disclosure.

FIG. 1 is a perspective view of a vehicle seat slide apparatus according to an embodiment of present disclosure and includes various components assembled together to enable the seat movement in a desired position. The seat sliding apparatus includes two identical tracks 101*a* and 101*b*, a seat mounting assembly 103*a* (or 103*b*) and an operating handle assembly 105*a* (or 105*b*). The tracks 101*a* and 101*b* are disposed in pairs along the lateral direction in the center of the vehicle and are fixed to the floor of the vehicle (not illustrated). The tracks have a groove extending along the length of the track that guides a sliding mechanism in the lateral direction. Holes are provided along the sides of the track that engage with a locking mechanism.

The seat mounting assembly 103*a* (or 103*b*) includes seat mounting brackets 107*a* and 107*b* (or 107*c* and 107*d*) and other attachments and fixtures to install a seat. The seat mounting assembly 103*a* (or 103*b*) is movably attached to the seat tracks 101*a* and 101*b* via a sliding mechanism. The seat tracks 101*a* and 101*b* are fixed to the car floor. The sliding mechanism includes an operating handle assembly 105*a* (or 105*b*) to move the seat mounting assembly 103*a* (or 103*b*) in a desired position and a locking mechanism to lock the sliding mechanism in the desired position.

The seat mounting assemblies 103*a* and 103*b* can freely slide along the track 101*a* and 101*b* when the operating handle assembly 105*a* or 105*b* is activated. As a result, the two seat mounting assemblies 103*a* and 103*b* can come in contact with each other. To restrict the seats from touching each other, two seat stoppers 110*a* and 110*b* are placed inside the tracks between the seat mounting assemblies 103*a* and 103*b*. The seat stoppers 110*a* and 110*b* can slide freely within the tracks 101*a* and 101*b* respectively. The number of seat stoppers does not necessarily correspond to the number of tracks. For example, in a two track system, the seat separation may also be achieved by placing one stopper in one of the tracks.

Figure 2:
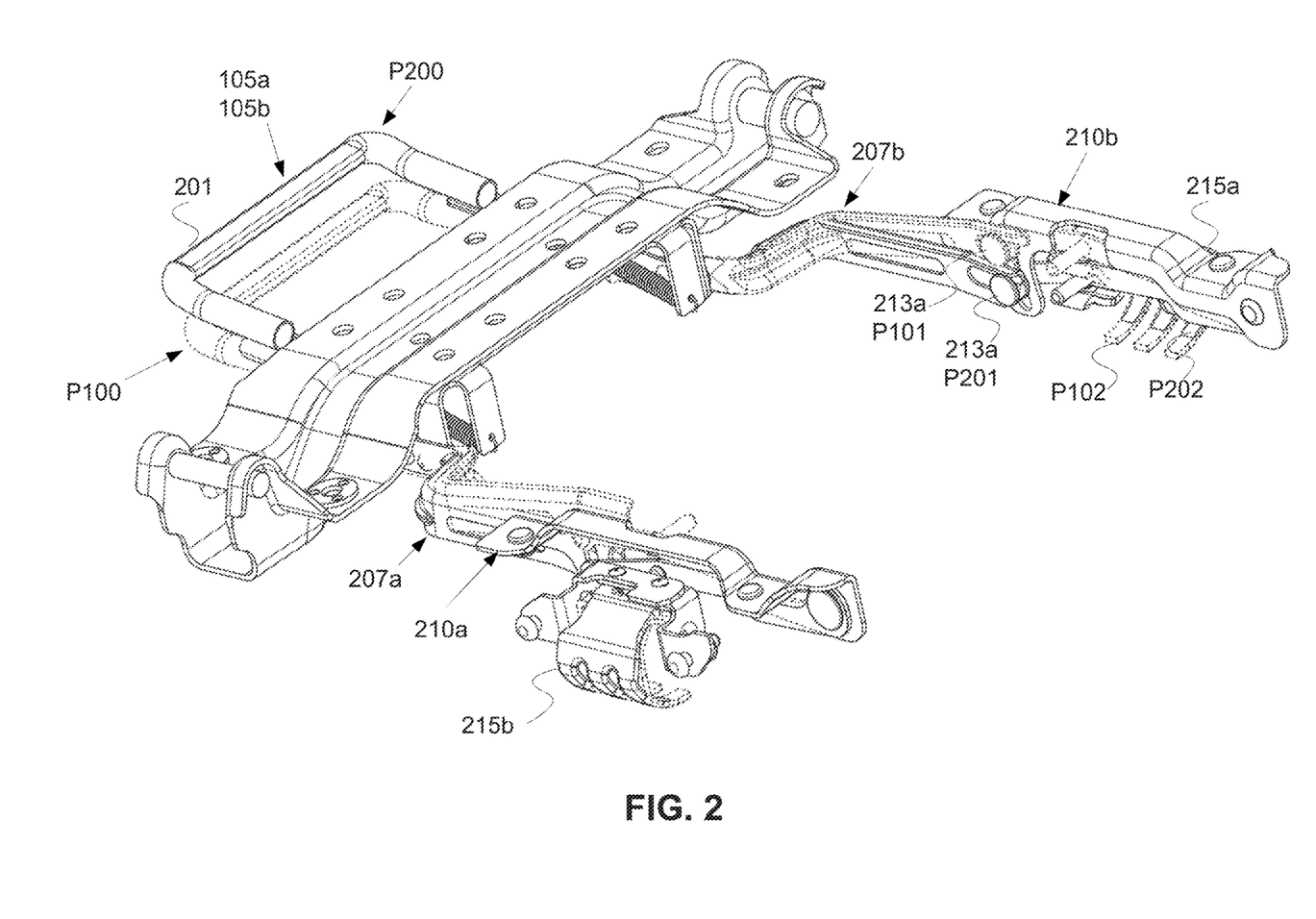
FIG. 2 illustrates the locking mechanism attached to an operating handle assembly.

FIG. 2 illustrates the locking mechanism attached to the operating handle assembly 105*a*. FIG. 2 illustrates the assembly of the locking mechanism. The locking mechanism 210*a* (or 210*b*) is connected to the lock bracket 207*a* (or 207*b*) via a grooved pin 213*a* (or 213*b*). The grooved pin 213*a* (or 213*b*) slides along the lock slot of the lock bracket 207*a* (or 207*b*) freely. The locking mechanism 210*a* (or 210*b*) also includes a fork grip 215*a* (or 215*b*) that is fixed with a pivot joint, as such can rotate about the corresponding pivot axis. When the grooved pin 213*a* and 213*b* slides along the lock slot of the lock brackets 207*a* and 207*b*, a link mechanism (not illustrated) causes the fork grips 215*a* and 215*b* to rotate about the pivot joint thus locking and unlocking the seat in a particular position. The fork grips 215*a* and 215*b* reside in the holes in the tracks 101*a* and 101*b* respectively.

The locking mechanism can be in a locked state (represented by dotted lines) or in an unlocked state (represented by solid lines). When the U-handle 201 is placed in a locked position P100, the grooved pin 213*a* (or 213*b*) is in position P101, the closed end of the lock slot of the lock bracket 207*a* (or 207*b*), and the fork grip is in position P102. To unlock, a force is applied at the U-handle 201 which moves the lock bracket 207*a* and 207*b* downwards and as a result the grooved pins 213*a* and 213*b* move towards the open end of the lock slot. In unlocked state, the U-handle 201 is placed in an unlocked position P200, the grooved pin 213*a* (or 213*b*) is in position P201, the open end of the lock slot of the lock bracket 207*a* and 207*b*, and the fork grip 215*a* and 215*b* are in a retracted position P202.

Figure 3:
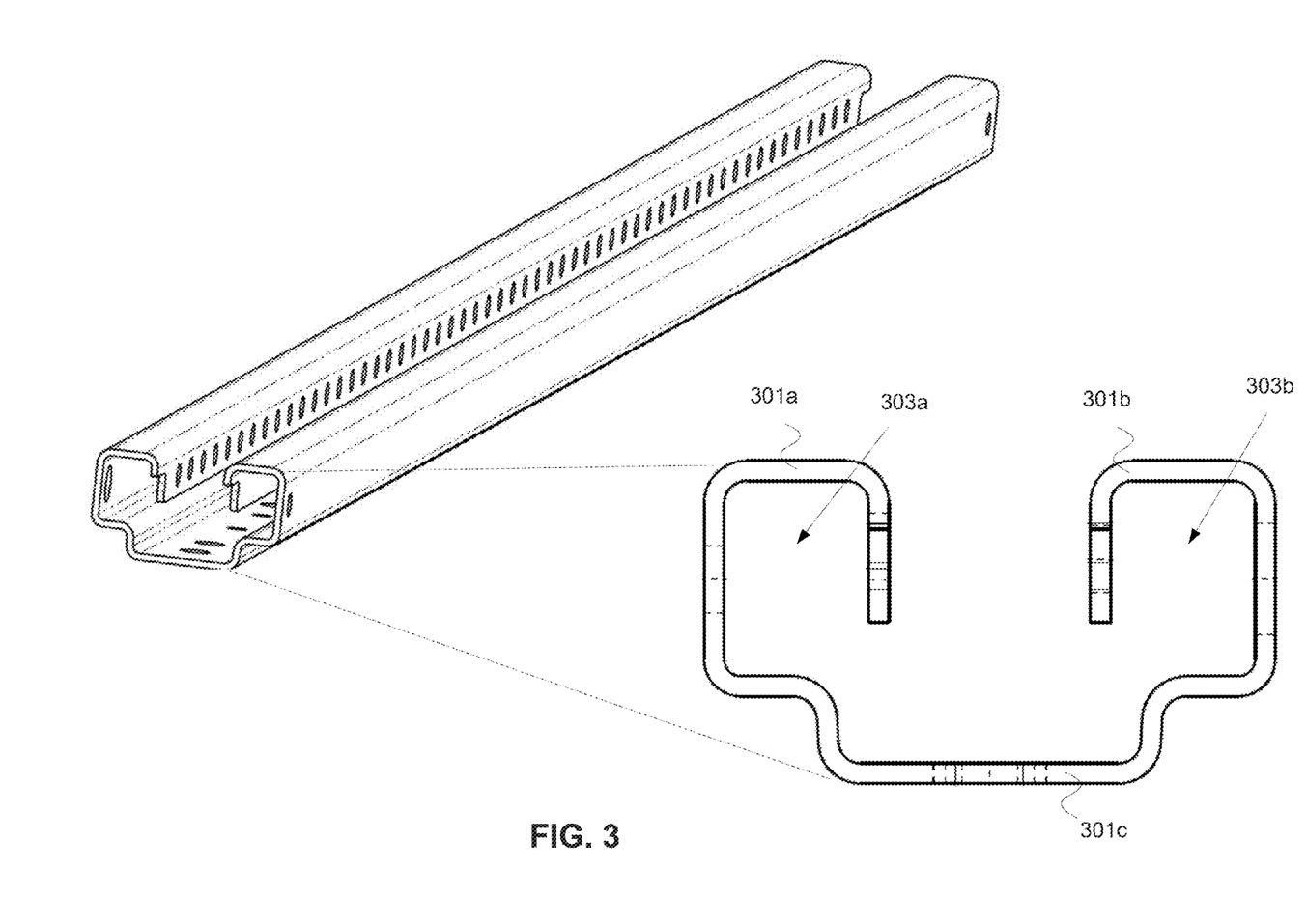
FIG. 3 illustrates the cross-section of a track according to an exemplary aspect of present disclosure.

FIG. 3 illustrates the cross-section of the tracks 101*a* and 101*b*. The track 101*a* (or 101*b*) has a unitary construction and a composite cross-section. The cross-section includes two hollow open-rectangles 301*a* and 301*b* separated from each other by a base plate, which a U-shaped element 301*c* according to the embodiment of present disclosure. The base plate has holes used to fix the tracks to a floor surface of the vehicle. The base plate may be fixed using fasteners such as bolts and rivets. The open-rectangles 301*a* and 301*b* are position about a vertical axis such that one of the open-rectangle 301*b* is a mirror image of the other. The hollow parts 303*a* and 303*b* of the open-rectangles 301*a* and 301*b* respectively extend throughout the length of the tracks 101*a* and 101*b*. The hollow parts 303*a* and 303*b* act as a guide to the stoppers 110*a* and 110*b* respectively. The track also includes lock holes in which the fork grip of the locking mechanism is engaged when a lock state of a seat is desired. The tracks may be laid laterally or longitudinally in a space behind the front row seats of the vehicle.

Figure 4:
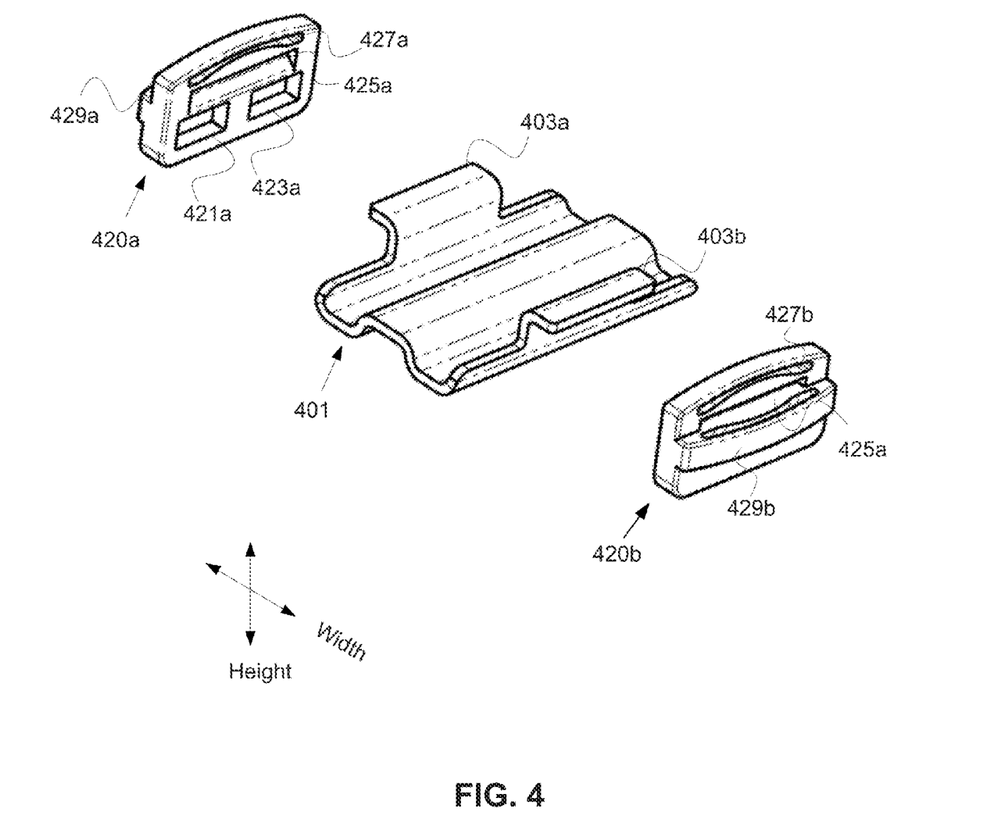
FIG. 4 is a perspective view a seat stopper according to an exemplary aspect of present disclosure.

FIG. 4 illustrates the seat stopper 110*a* (or 110*b*), which is designed to keep the seat mounting assemblies 103*a* and 103*b* separated from each other. The seat stopper includes three parts: shoes 420*a* and 420*b*, and a bracket 401. The shoe 420*a* includes three rectangular slots 421*a*, 423*a*, and 425*a*, and a profiled slot 427*a*. The shoe 420*b* has similar slots as 420*a*. The rectangular slots 421*a* and 423*a* are a recess and do not completely extend through the material of the shoe, while the rectangular slot 425*a* (or 425*b*) and the profiled slot 427*a* (or 427*b*) extend completely through the material of the shoe creating a through hole. The back end of the shoe 420*a* (or 420*b*) includes a rib 429*a* (or 429*b*) that extends throughout the length of the shoe 420*a* (or 420*b*). The shoes 420*a* and 420*b* are made of plastic. The height and width of the shoe are slightly smaller than the hollow part of the open-rectangle of the track.

In an alternate embodiment, the shoe may be modified in different ways. For instance, the rectangular slots 421a and 423a can be made circular, triangular or any other shape, cut to extend completely create a through hole. Alternately, one or more of these slots may not be created. The profiled slot 427a can be of any shape and need not extend throughout the material of the shoe thus creating a recess. Furthermore, the left and right end of the shoes may be made of rubber to provide cushioning effect and noise reduction, steel to provide rigidity and strength, or any other material depending on the desired properties of the stopper. Similarly, the material and shape of the ribs may be changed. For instance, the ribs may be made of metal like steel for additional strength and rigidity.

Referring back to FIG. 4, the shoe bracket 401 has a unitary construction and includes two flanges 403a and 403b. The bracket has a wave-like W-shaped cross-section. The flanges 403a and 403b are located in the center part of the bracket and smaller than the total length of the bracket. The total length of the bracket 401 must be smaller than the maximum distance between the seat mounting assemblies 105a and 105b (in FIG. 1). The bracket 401 is composed of steel according to the embodiment of present disclosure. However, it can be made of any other material like rubber, plastics, or metal depending on the desired properties such as less friction, high strength and rigidity, etc.

The bracket 401 is connected to the shoes 420a and 420b; hence the shoes stay together and do not slide independently of each other inside the tracks 101a and 101b respectively. The flange 403a fits in the rectangular slot 425a of the shoe 420a, while the flange 403b fits in the rectangular slot 425b of the shoe 420b. As such the dimensions of the slots and flanges must be compatible with each other.

Figure 5:
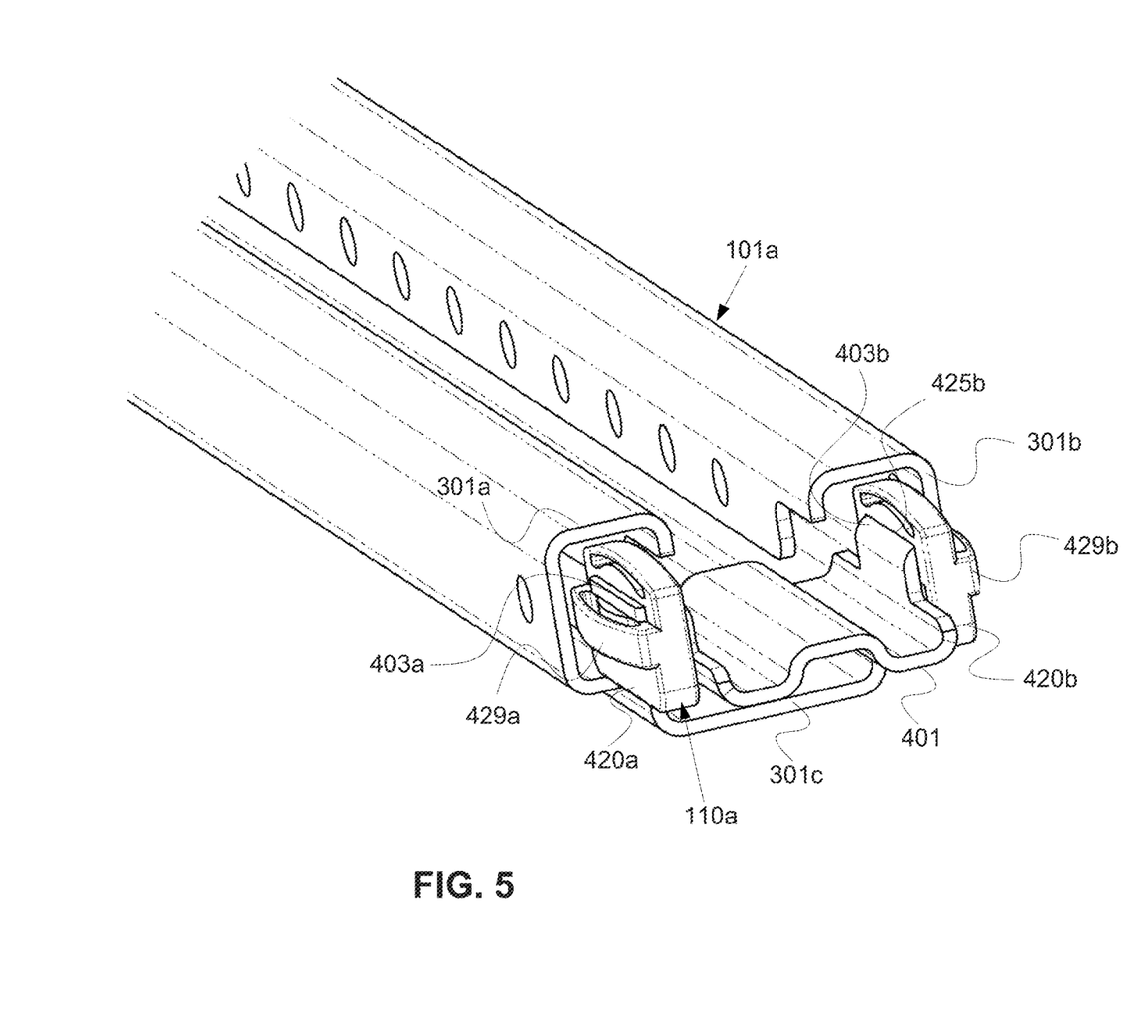
FIG. 5 is a perspective view of mounting of a central seat stopper placed inside the tracks according to an exemplary aspect of present disclosure.
Figure 6:
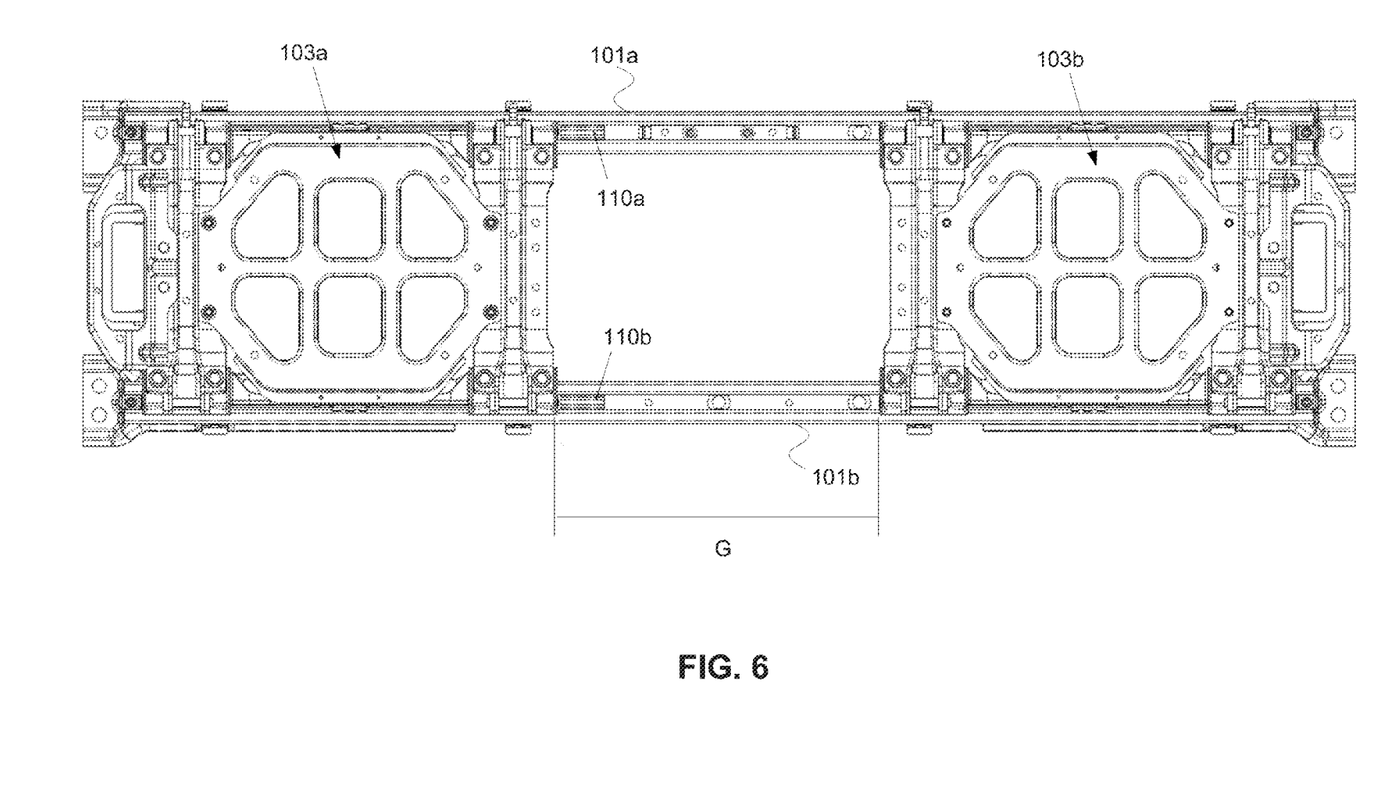
FIG. 6 is an elevation view of two vehicle seat set apart at the ends and a seat stopper in each of the track according to an exemplary aspect of present disclosure.
Figure 7:
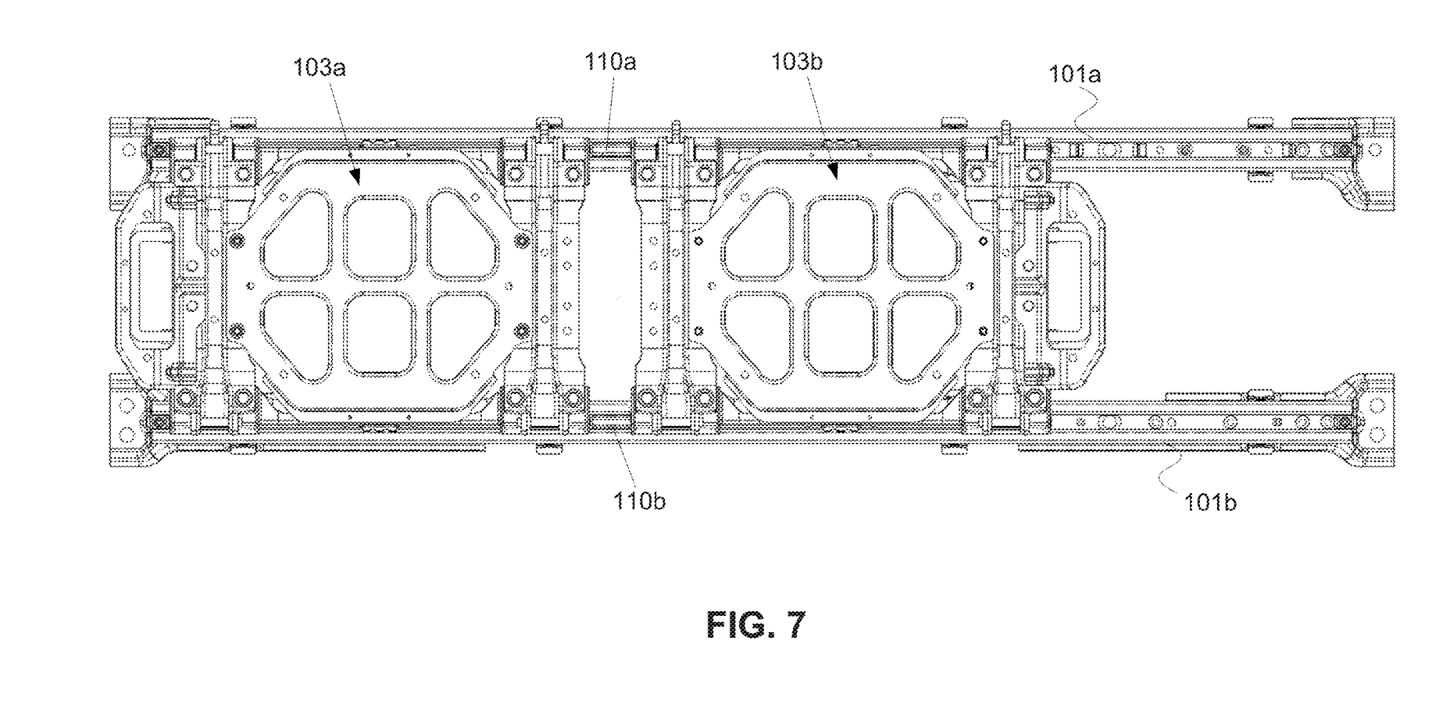
FIG. 7 is an elevation view of two vehicle seat placed together at the left end and a seat stopper between the seats in each of the track according to an exemplary aspect of present disclosure.
Figure 8:
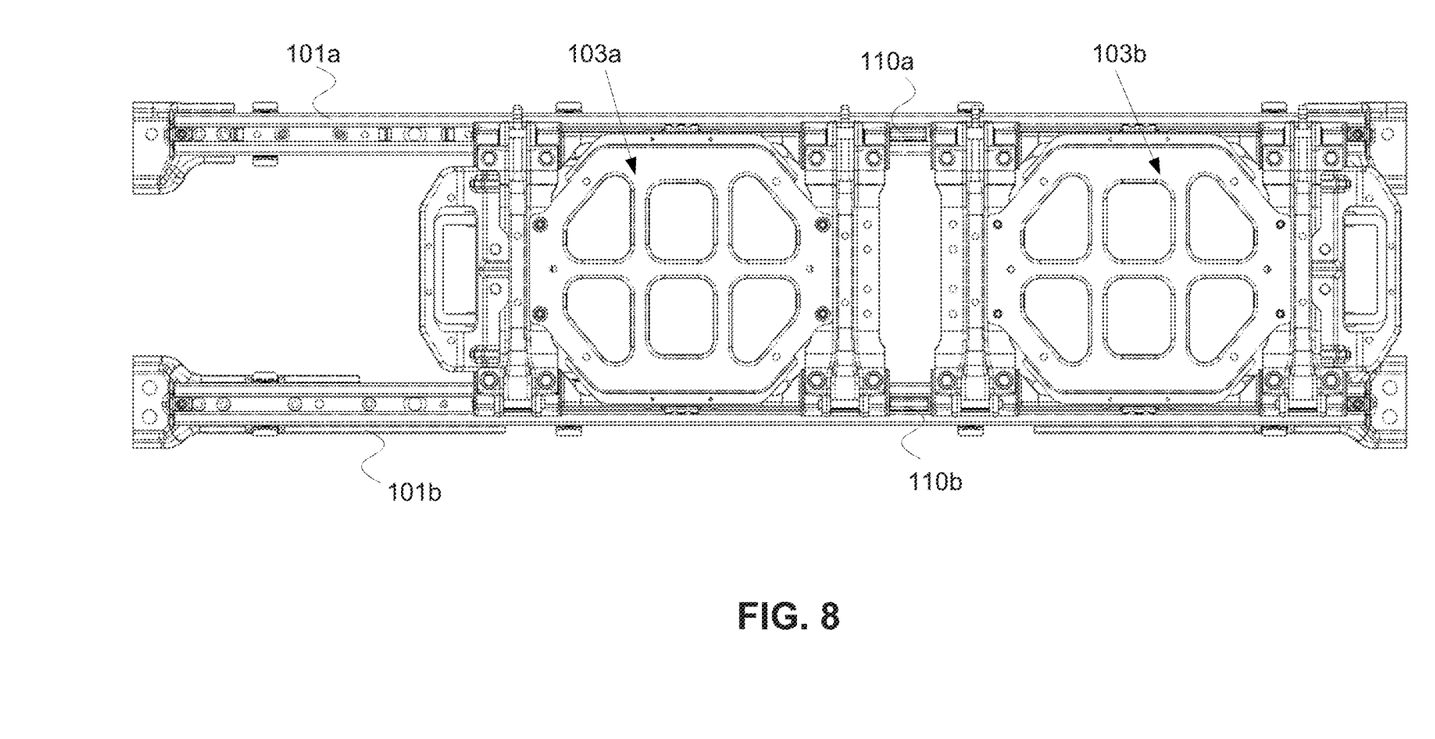
FIG. 8 is an elevation view of two vehicle seat placed together at the right and a seat stopper between the seats in each of the track according to an exemplary aspect of present disclosure.

FIG. 5 illustrates the assembly of the seat stopper 110a in to the tracks 101a. After assembling the bracket 401 and the shoes 420a and 420b, one shoe 420a slides in the hollow part of one open-rectangle 301a of the track, while the other shoe 420b slides in the hollow part of the second open-rectangle 301b of the track. Note that the bracket 401 is able to slide unobstructed while connecting the shoes 420a and 420b since the open part of the hollow the open-rectangle allows the flanges 403a and 403b to stay connected to the shoes. The stopper is installed in the tracks prior to installing the seat mountings 103a and 103b. Once the seat mounting assembly is installed, the stopper slides freely along the tracks in the gap between the two seats. The stopper allows the seats to the mounted in any position while maintaining a gap between the seats. FIGS. 6-8 illustrate different configurations of the seats installed on tracks containing a stopper.

FIG. 6 illustrates a wide mode configuration of the seat mounting assemblies 103a and 103b in which the seat mountings are located at the left end and the right end respectively of the tracks 101a and 101b. In the wide mode, the seat stoppers 110a and 110b move free between the seat gap G.

FIGS. 7 and 8 illustrate a bench mode configuration of the seat mounting assemblies 103a and 103b, where both the seat mountings are placed together. In FIG. 7, the seat mounting assemblies are located at the left end of the tracks 101a and 101b, while in FIG. 8, the seat mounting assemblies 103a and 103b are located at the right end of the tracks 101a and 101b. In the bench mode, the seat mounting assemblies 103a and 103b are separated by a gap equal to the length of the seat stoppers 110a and 110b. Hence the stoppers 110a and 110b does not have any room to move. The distance between the seat mounting assemblies is equal to the length of the stopper. For a larger separation of seats, the length of the stopper must be chosen accordingly.

Also, it should be understood that this technology when embodied is not limited to the above-described embodiments and that various modifications, variations and alternatives may be made of this technology so far as they are within the spirit and scope thereof.

Figure 9:
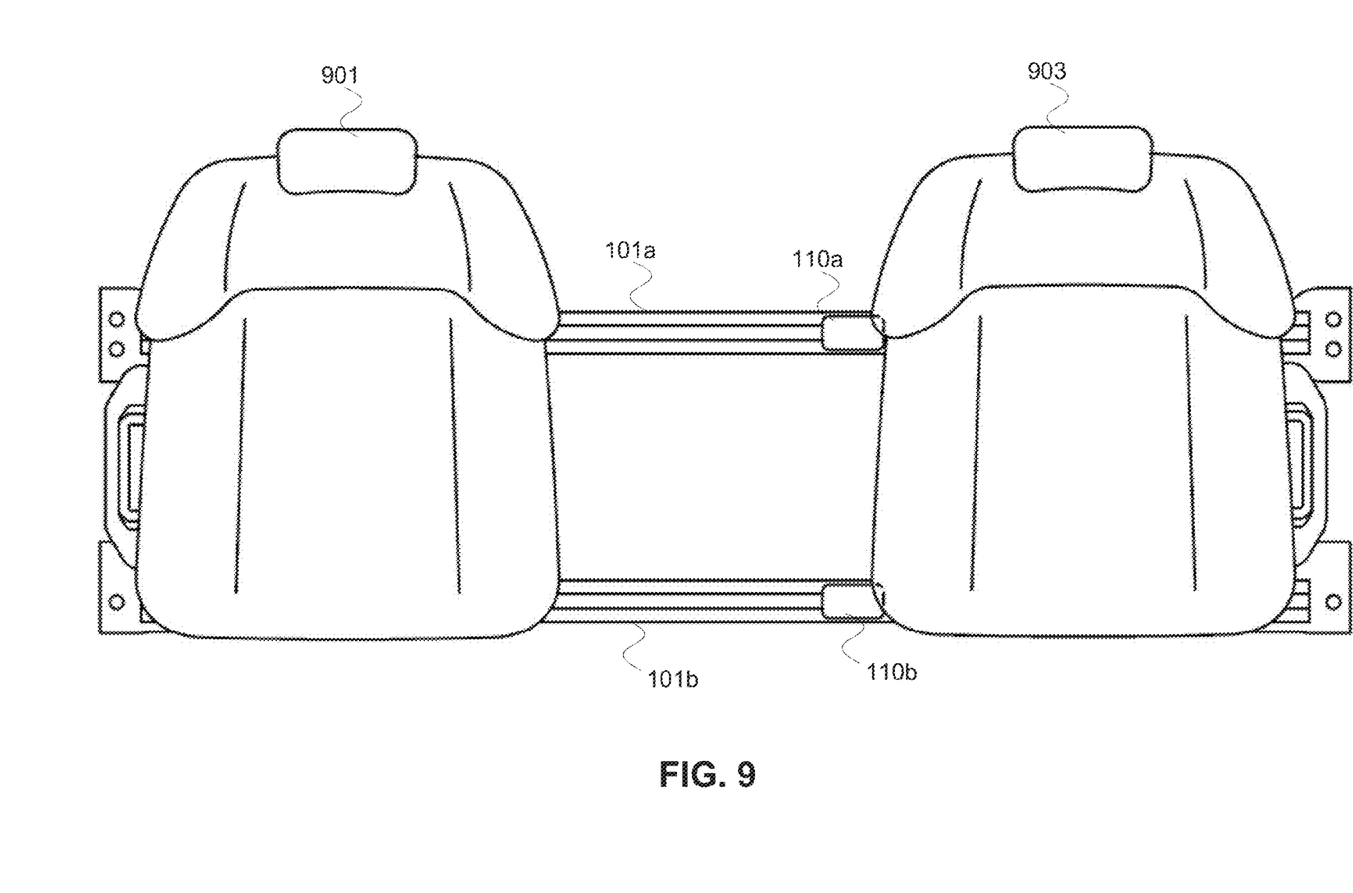
FIG. 9 is a schematic of a seat arrangement with two seats set apart at the ends of the track and separated by a seat stopper in each of the track according to an exemplary aspect of present disclosure.
Figure 10:
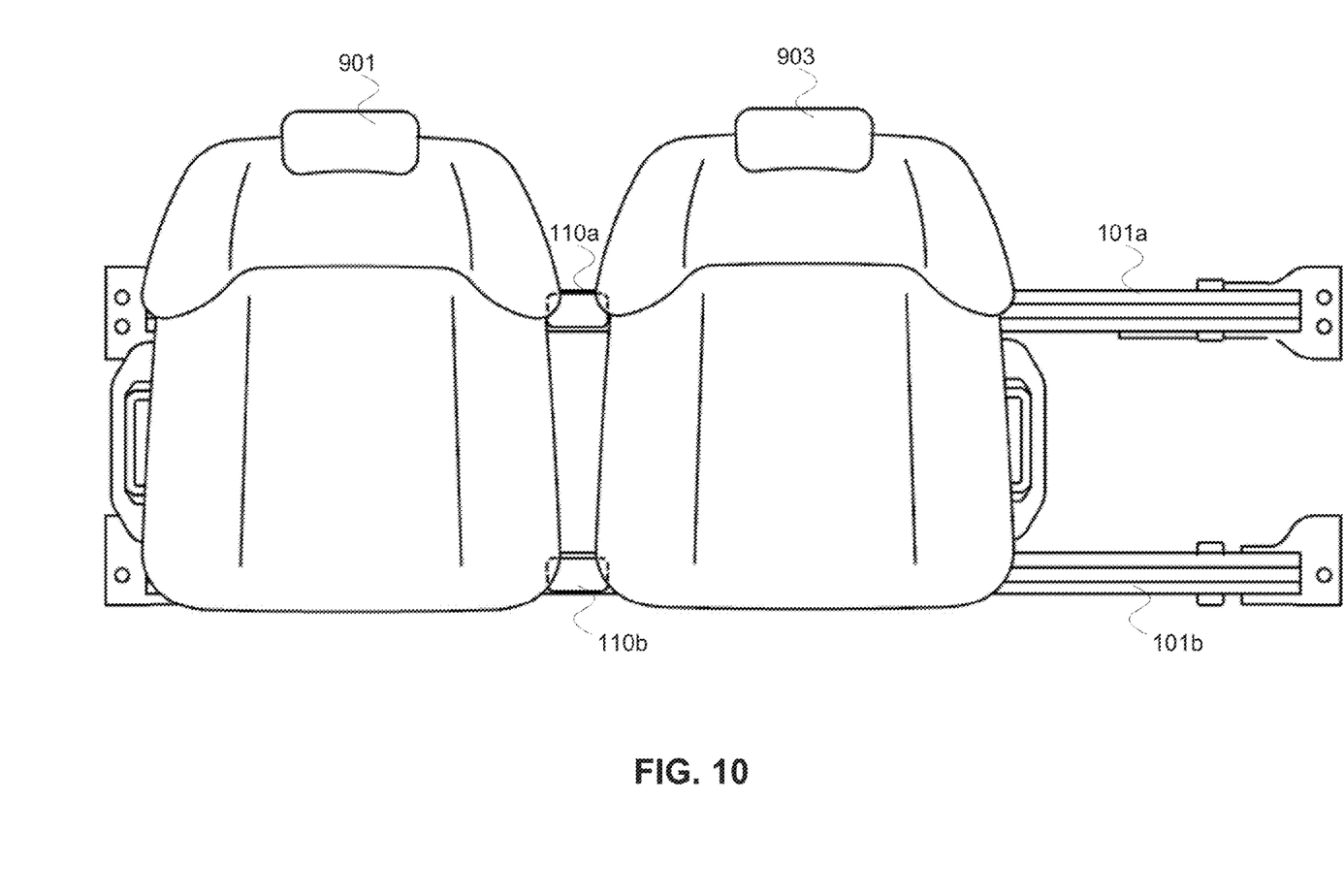
FIG. 10 is a schematic of a seat arrangement with two seats placed together at the left end and separated by a seat stopper in each of the track according to an exemplary aspect of present disclosure.
Figure 11:
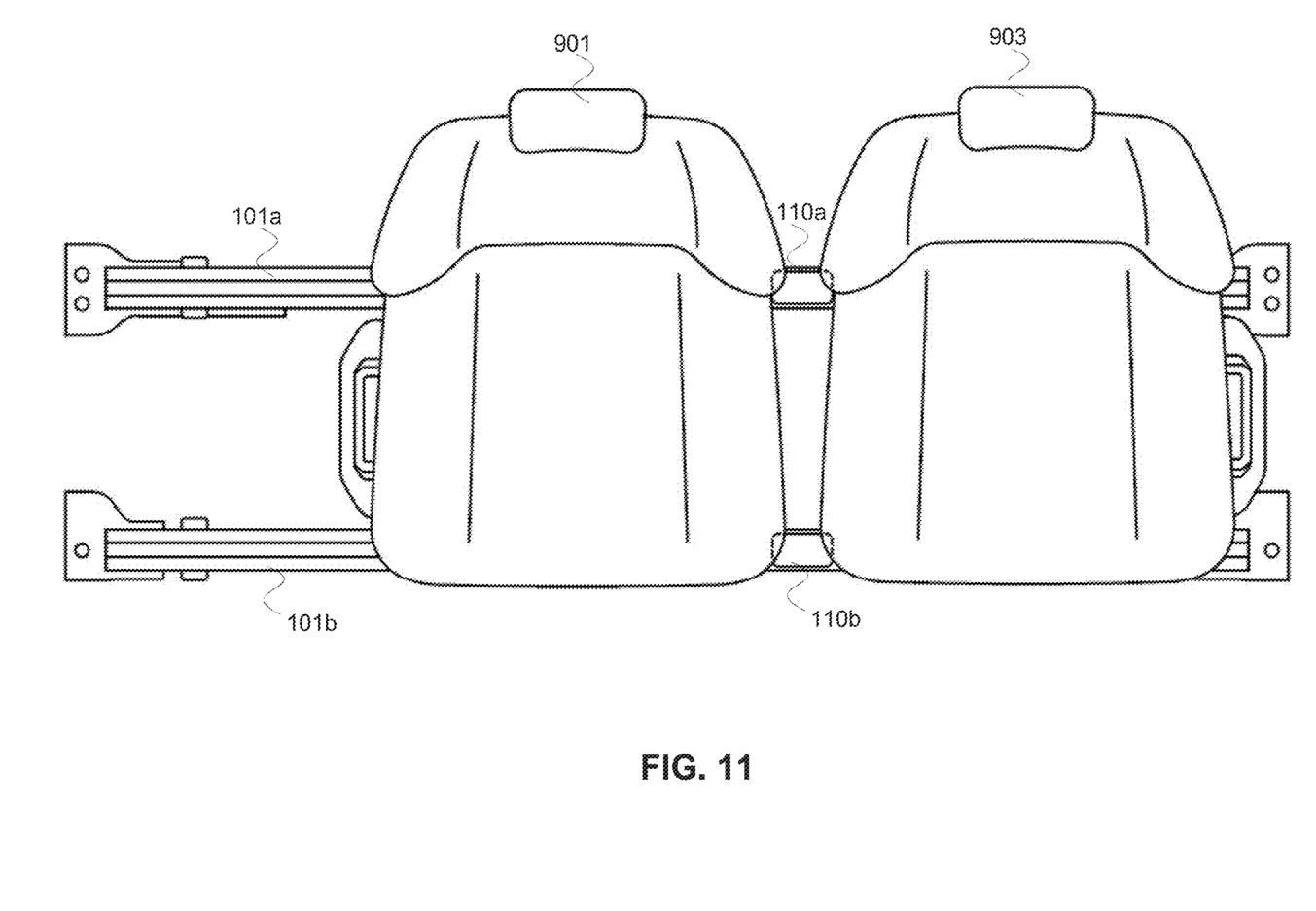
FIG. 11 is a schematic of a seat arrangement with two seats placed together at the right end and separated by a seat stopper in each of the track according to an exemplary aspect of present disclosure.

FIGS. 9-11 illustrate three different configurations of seats 901 and 903 similar to that illustrated in FIG. 6-8. The seats 901 and 903 are separated by stoppers 110a and 110b installed in the tracks 101a and 101b respectively. The seats may be installed front-facing, in which a person (not shown) seating will be facing the front of the vehicle or back-facing, in which a person (not shown) seating will be facing the back of the vehicle. In FIGS. 9-11, the seats 901 and 903 are front-facing, in which the back of the seat is positioned rearwards. Alternately, the seats can be configured as a combination of front-facing and back-facing. For instance, one of the seats say 901 may be front-facing and the other seat 903 may be back-facing. Alternately, both the seats 901 and 903 may be back-facing. In the embodiment of present disclosure, the seat mounting assemblies are installed such that the U-handles are away from each other. Alternately, the seat mounting assemblies may be installed such that the U-handles are facing each other.

The invention claimed is:

1. A seat arrangement apparatus for a vehicle seat, comprising:
    at least two tracks fixed to a floor of a vehicle each track including a base separating a first hollow portion and a second hollow portion;
    at least two seat mounting assemblies movable along the at least two tracks; and
    a stopper movable inside at least one of the at least two tracks between the at least two seat mounting assemblies to prevent the at least two seat mounting assemblies from touching each other when positioned together,
    wherein the stopper comprises a first shoe moveable in the first hollow portion, a second shoe moveable in the second hollow portion, and a bracket that holds the first shoe and the second shoe, and
    wherein the bracket includes a first flange that connects to a first slot of the first shoe and a second flange that connects to a second slot of the second shoe.

2. The seat arrangement apparatus for a vehicle seat according to claim 1,
    wherein the first shoe includes first rib on a side opposite of the first slot, the first rib slideable on an inner peripheral face of the first hollow portion, and
    wherein the second shoe includes second rib on a side opposite of the second slot, the second rib slideable on an inner peripheral face of the second hollow portion.

3. The seat arrangement apparatus for a vehicle seat according to claim 1,
    wherein the at least two tracks each include a plurality of holes, and
    wherein the seat arrangement apparatus further comprises a locking mechanism that engages and disengages with the plurality of holes of the track when a force is applied at an operating handle.

* * * * *